Sept. 9, 1924.

L. KRIEGER 1,508,371

PROCESS OF PRESERVING BATTERIES

Filed Feb. 19, 1924

Inventor
Louis Krieger
by
His Attorney

Patented Sept. 9, 1924.

1,508,371

UNITED STATES PATENT OFFICE.

LOUIS KRIEGER, OF PARIS, FRANCE, ASSIGNOR TO GENERAL ELECTRIC COMPANY, A CORPORATION OF NEW YORK.

PROCESS OF PRESERVING BATTERIES.

Application filed February 19, 1924. Serial No. 693,881.

*To all whom it may concern:*

Be it known that I, LOUIS KRIEGER, a citizen of the French Republic, residing at Paris, France, have invented certain new and useful Improvements in Processes of Preserving Batteries, of which the following is a specification.

My invention relates to the process of preserving batteries and is especially applicable for preserving so-called dry batteries.

One of the main difficulties in the manufacture of dry batteries for future demand is due to the fact that the stock put in storage deteriorates, so that the commercial value of the battery is impaired.

I have found, however, that this objection can be overcome by properly placing the batteries in storage and preserving them at comparatively low temperatures. I have found that the reactions that continued to take place when batteries are kept in stock and which decrease the capacity of the battery, stops almost entirely at low temperatures, thereby conserving the batteries.

The invention consists in conserving the batteries manufactured, in a dry place at a low temperature, for example, at about zero degree centigrade. However, the conserving temperature varies anywhere from minus 30 degrees to plus 10 degrees centigrade. I have found, however, that the lower the temperature, the better the condition of preservation and that the zone of temperatures to be preferred for a practical application of the method seems to lie between zero and minus 5 degrees centigrade. It is necessary that the medium into which the batteries are placed be free from humidity, in case that this medium be a gas, so as not to cause any condensation of water on the elements or their wrappers as this condensation tends to establish connections that favor the spontaneous discharge of the batteries. Instead of a gas, however, an electrical insulating liquid may be used and preferably a liquid of this character having a low point of solidification. Also, an electrical insulating body with a low point of fusion at about from 15 to 25 degrees centigrade for example, may be used for covering the elements that are to be conserved. These elements may be freed from the insulating body by fusion of the insulating body.

The low temperature of the medium in which the batteries are placed may be produced by any suitable means and the same may be said relative to the means for drying the gaseous medium when gas is to be used. The following examples will suffice to give an understanding of the scope of the invention without limiting its form. The process and means for carrying out my invention will be hereinafter more fully set forth and claimed, reference being had to the accompanying drawings in which Figs. 1 through 6 show various devices and arrangements for carrying out the process of my invention.

Referring more in detail to the accompanying drawing, Fig. 1 shows an enclosure $g$ comprising batteries $a$, $a'$, $a^2$, $a^4$, etc., enclosed in any sort of a refrigerator $b$. This refrigerator has a cold chamber in which the batteries are located, immersed in a suitable bath $c$ formed by a liquid cooled by the circulation of a cold liquid, for example, in the tubes $d$. The batteries, $a$, $a'$, are placed on a perforated base $e$ below which there is located the drying matter $f$, such as chloride of calcium or other suitable drying material; Fig. 2 shows a modified arrangement in which the container $g$ is cooled directly by the cooling tubes $d$, with a receptacle $h$ for the drying material placed between the batteries. The containers are closed for the purpose of preventing as much as possible its acquiring heat from the surrounding medium, as for example, from the warmer surrounding outside air.

In Fig. 3 the batteries, $a$, $a'$, $a^2$, etc., are immersed in an electrical insulating liquid $i$, as for example, alcohol, tetrachloride of carbon, etc., with a low point of solidification and which has no chemical action upon the elements from which elements the liquid can be evaporated at a low temperature. In this case the container may be simply closed to prevent evaporation of the insulating liquid. This liquid can be cooled either directly, as in Fig. 4, or by placing it into the refrigerator, as in Fig. 5.

Figure 1:
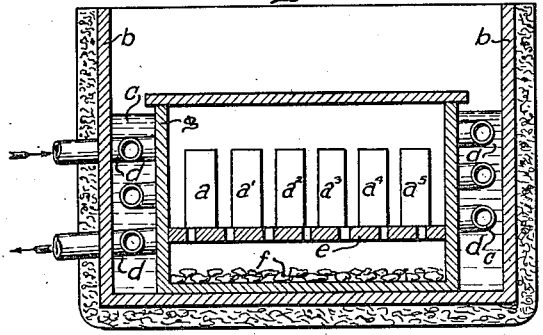
Figure 2:
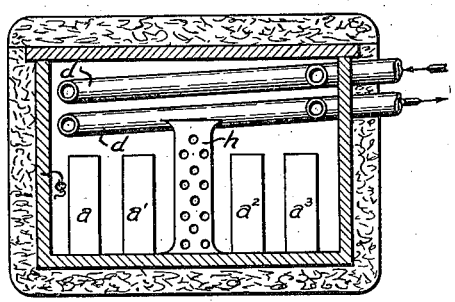
Figure 3:
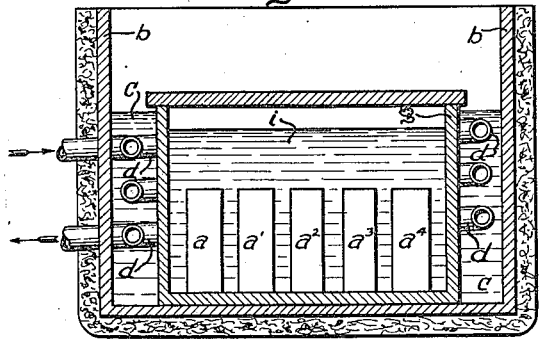
Figure 4:
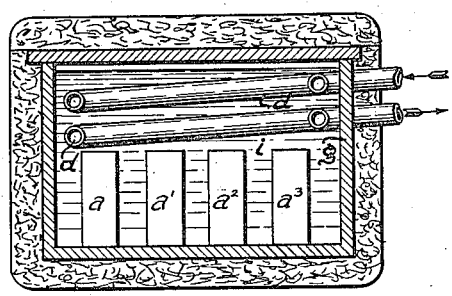
Figure 5:
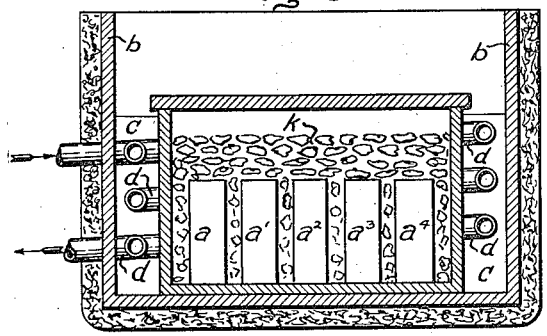
Fig. 5 represents the container with the batteries $a$, $a'$, $a^2$, etc., immersed in a solid electrical insulating body $k$ having a low fusion point anywhere from 15 degrees to 25 degrees centigrade, for example. The container is cooled by means of a refrigerator, as indicated in Fig. 1.
Figure 6:
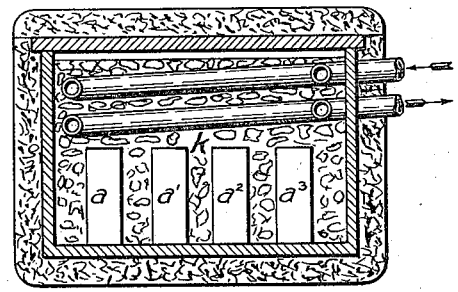
Fig. 6 represents the same arrangement with the batteries immersed in a solid body and shows the container cooled directly as indicated in Fig. 2.

With this last combination, it is not necessary to close the container except in the case where the vapor pressure of the insulating body in a solid state would be sensitive enough at low temperatures to cause losses.

It will be understood that while I have described the process in specific detail and have shown specific means for carrying it out, in view of the disclosure it is obvious that variations in my invention will readily suggest themselves to others, which variation will not depart from the spirit of my invention, the scope of which is indicated by the accompanying claims.

What I claim as new and desire to secure by Letters Patent of the United States is:—

1. The method of conserving a battery while not in use which consists in placing the battery in a container having a dry insulating medium inert with respect to the elements of the battery and maintaining the battery at a temperature below 10 degrees centigrade.

2. The method of conserving a battery while not in use which consists in placing the battery in a container having an insulating medium inert with respect to the elements of the battery which medium fuses at a point below 25 degrees centigrade and maintaining the temperature of the battery below 10 degrees centigrade.

3. The method of conserving a battery while not in use which consists in placing the battery in a container having an insulating medium inert with respect to the elements of the battery, which medium evaporates at a point below 25 degrees centigrade and maintaining the temperature of the battery below 10 degrees centigrade.

4. The method of conserving a battery while not in use which consists in placing the battery in a container having an insulating medium inert with respect to the elements of the battery, which medium solidifies at a point below 25 degrees centigrade, and maintaining the temperature of the battery below 10 degrees centigrade.

5. The method of conserving a battery while not in use which consists in placing the battery in a container having a dry insulating gas inert with respect to the elements of the battery and maintaining the battery at a temperature below 10 degrees centigrade.

LOUIS KRIEGER.